June 14, 1960
A. E. LE VAN
2,940,704
INSTRUMENT CONNECTIONS
Filed Feb. 7, 1957
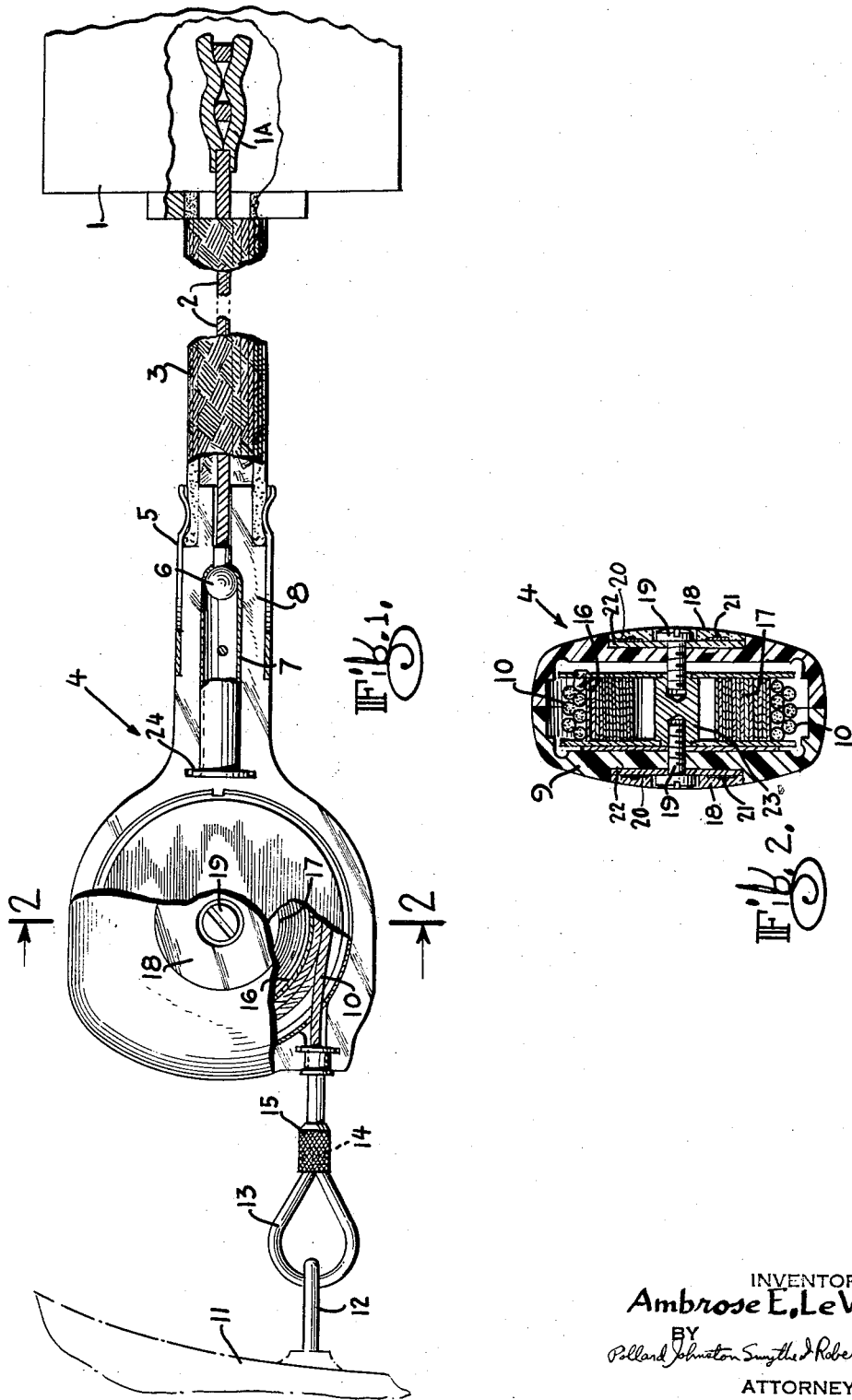
INVENTOR
Ambrose E. LeVan
BY
Pollard Johnston Smythe & Robertson
ATTORNEYS

United States Patent Office 2,940,704
Patented June 14, 1960

2,940,704

INSTRUMENT CONNECTIONS

Ambrose E. Le Van, Hatfield, Pa., assignor to American Machine and Metals, Inc., New York, N.Y., a corporation of Delaware Filed Feb. 7, 1957, Ser. No. 638,790

2 Claims. (Cl. 244—150)

This invention relates to parachute release mechanisms and particularly to a means permitting movement by the person equipped with the mechanism without arming or activating the same.

In automatic parachute release mechanisms, a time activated device having barometric control is employed for automatically operating the parachute ripcord and opening the parachute after the parachute and its attached load have left the airplane. In one form of parachute release mechanism, the parachute ripcord is operated upon release of a powerful energized spring, the spring being connected to the ripcord. The spring is released for performing the ripcord pulling operation after a predetermined time by a suitable timing or escapement mechanism, the timing mechanism not being actuatable until a barometric device releases the same at a predetermined pressure or altitude. An arming pin may be provided for blocking operation of the timing mechanism until the pin is withdrawn therefrom, such a pin being necessary to prevent premature operation. In some prior arrangements, the wearer pulls the arming pin just before he jumps from the airplane so that the parachute will not open before it is needed. When an ejection seat is involved, the person actuates a seat ejecting mechanism which propels the seat and person out of the airplane. After a predetermined time lapse for allowing the person and the seat to clear the airplane, the person and the seat then are separated from each other. At this time, it is desirable to have the arming pin pulled from the parachute release mechanism to put the pressure and time actuated device into an operative condition so as to permit the parachute to be opened at the desired moment in response to action of the parachute release mechanism. Thus, a connection or lanyard is needed between the parachute release mechanism on the wearer and the seat or other object. Prior arrangements connecting the seat with the arming pin have been cumbersome and unsatisfactory. The arrangement must not hinder movement of the wearer and must not tangle or prematurely pull out the arming pin. The connection between the wearer and the seat must have yielding means so as to provide for unhindered movement therebetween and yet so that the connection cannot become twisted or entangled. The use of a flexible lanyard with an encompassing spring tending to shorten the connection has been found to be bulky, awkward, and susceptible of faulty operation.

One of the objects of the invention is to provide a means for placing a parachute release mechanism in an operative condition, yet which will permit free movement of the wearer, the means being compact, durable and positive in operation.

Another object of the invention is to provide a connecting or lanyard means which will exert a substantially constant force regardless of its length.

In a preferred form, the yielding means or lanyard of the invention can be utilized in conjunction with a parachute release mechanism having a trip or arming means normally rendering the release mechanism inoperative, movement of the trip or arming means putting the release in operative condition. The lanyard assembly includes a main body or arming knob, means separably connecting the main body to the trip or arming means, rotatable spring actuated winding means, fixed holding means for attachment to the ejection seat or the like, and connecting means, such as a cable, connected at one end to the holding means and at the other end to the winding means, the connecting means being wound around the winding means. The yielding spring means preferably is of the constant force type as will be described hereafter. This construction permits the movement of the main body a predetermined distance relative to the end of the connecting means connected to the holding means without causing relative movement of the main body and the trip away from each other to arm the release. When the arming knob or main body and trip on the release are moved sufficiently far relative to each other, such as when the seat is separated from the wearer, the arming pin will be pulled from the release and such will place the release in an operative condition.

These and other objects, features and advantages of the invention will become apparent from the following detailed description and drawings which are merely exemplary.

In the drawings:

Fig. 1 is an elevational view with parts broken away and other parts shown in cross-section; and Fig. 2 is a cross-sectional view of the device taken along the line 2—2 of Fig. 1 looking in the direction of the arrows.

A pressure responsive parachute release mechanism, schematically indicated by reference numeral 1 has means (not shown) for keeping it in an inoperative condition until a trip or arming pin 1A, swaged or suitably fastened to cable 2, is released or withdrawn by sufficient movement of the arming cable 2 to the left (Fig. 1), a predetermined movement pulling the arming pin from mechanism 1 for suitably placing the parachute release mechanism in operable condition so that it will start to operate at the set altitude. An example of one type of parachute release mechanism including such an arming pin is shown in United States Letters Patent No. 2,114,897 issued to William Bird and Donald R. Clark. Arming cable 2 may be enclosed in a flexible or braided tube 3 which is firmly connected at one end to mechanism 1 and releasably connected at the other end to a main body, reel mechanism or arming knob assembly, shown generally at 4. The flexible tube is removably attached to the reel mechanism or assembly by a clamp or socket 5 carried by the reel mechanism 4.

One end of the cable 2 may have an enlargement such as the ball 6 swaged or suitably fastened thereto, said ball being movably held in tube 7. Tube 7 is inserted in neck 8 of the body 9 of the reel assembly. Tube 7 extends along the neck 8 and can have a flange 24 to distribute stresses from the neck to the body 9. The cable and ball are laterally movable in tube 7 to permit relative movement for assembly purposes and to provide sufficient movement to prevent premature operation. The other end of arming cable 2 has the arming pin 1A attached thereto, said cable and pin being slidable out of mechanism 1 and through tube 3 when the tube 3 is pulled out of clamp or socket 5. The body of the reel assembly or arming knob preferably is made of a suitable plastic that will withstand shock stresses at the large temperature changes involved, one example being that sold under the designation "Tenite No. 2."

Cable 2 should not be released from mechanism 1 to place said mechanism in an operative condition until the person using the mechanism is separated from his seat or the like to which the other end of the reel mechanism is connected. However, due to the necessity of movement by the pilot relative to his seat a certain amount of freedom of movement or "play" must be provided so that the parachute release mechanism will not be rendered operative inadvertently or prematurely. For this reason, a cable 10 is employed which is connected at one end to a seat 11 or the like through suitable "keys" or hooks 12 of well-known type.

In order to allow for the use of the reel mechanism with a plurality of different types of "keys," an eye 13 can be used which is threaded at end 14 into a recess in knurled knob 15 connected to cable 10. Alternatively, a plurality of "keys" can be fastened onto the hook.

In order to provide the aforementioned movement of the wearer without arming of the release, cable 10 is arranged to be wound onto rotatable drum 16 when the cable is in its non-extended or retracted position, the cable being held in its wound position by spiral or coiled spring 17.

So as to prevent premature operation, the same force should be exerted by spring 17 regardless of the extension of the cable 10 relative to assembly 4. Thus, the spring 17 must have constant tension characteristics.

In a preferred form, the spring is of the non-cumulative force ribbon type having a non-flat cross-section, the spring being formed so that the spring force is developed where the straightening action from an arcuate to a flat cross-section takes place. In such a spring, the sections are related so that there is an equal resistance to straightening along the entire spring. One example of a preferred form of such a spring is found in Patent No. 2,609,193. Another type of such a spring is seen in Patent No. 2,647,743.

The use of such a non-cumulative force spring permits cable 10 to be extended to its full length with the same force, there being no additional force exerted as it approaches its fully extended condition. Such added force might be sufficient to cause separation of cable 3 from arming knob 4 so as to result in arming cable 2 being withdrawn from the release mechanism prematurely.

It is desirable to identify the character of the device and also to assist the pilot in locating the same in the dark. Transparent panel 18 may have screws 19 passing through suitable apertures, said screws engaging spring anchor 23.

Disc 22 may have radiant or luminous material 20 thereon, opaque indicia being placed on the outer surface so that the indicia will appear in silhouette. Transparent panel 18 can be heat sealed to disc 22 enclosing the radiant material and indicia, the disc 22 in turn being cemented to the walls of the cavity in body 9.

In summary, the invention in its preferred form is utilized with a parachute release mechanism in which the parachute ripcord is operated by release of a powerful energized spring. The timing mechanism may be provided with an arming pin for blocking its operation to prevent premature functioning until the pin is withdrawn therefrom. The wound cable of the lanyard connection having constant force characteristics permits movement of the wearer without any hindrance and without prematurely removing the arming pin from the parachute release mechanism.

It is to be understood that details of construction can be varied without departing from the spirit of the invention except as defined in the appended claims.

What is claimed is:

1. A lanyard device for a parachute release mechanism comprising a main body, cable means releasably connected to an actuating mechanism and slidably connected to the main body so that the main body can move a limited distance relative to said actuating mechanism without causing separation of said cable means from said actuating mechanism, said cable means being separated from said actuating mechanism when the relative movement between said actuating mechanism and said main body exceeds said limited amount, winding means carried by said body, said winding means having a non-cumulative force spring therein formed so that the spring force is developed where the straightening action from the arcuate to a flat section takes place, the sections of said spring being related so that there is an equal resistance to straightening along the entire spring, fixed holding means, and connecting means connected at one end to said holding means and at the other end to said winding means and wound thereon, thereby permitting said main body to be moved a predetermined distance relative to said one end without causing relative movement of the main body and the actuating mechanism away from each other.

2. A lanyard device for a parachute release mechanism comprising a main body, means releasably connecting the main body to a parachute actuating mechanism so that, when there is relative movement between said actuating mechanism and said main body away from each other, the releasable connecting means will be separated from said actuating mechanism, winding means carried by said body, said winding means having a non-cumulative ribbon force spring therein, said spring having a non-flat cross-section at rest, and being formed so that the spring force is developed where the straightening action from the arcuate to a flat section takes place, adjacent sections of said spring being related so that there is an equal resistance to straightening along the entire spring, fixed holding means adapted to be connected to an aircraft, and connecting means connected at one end to said holding means and at the other end to said winding means and wound thereon, thereby permitting said actuating means and said main body to be moved the length of said connecting means from said holding means without causing relative movement of the main body and the actuating mechanism away from each other.

References Cited in the file of this patent

UNITED STATES PATENTS

| | | |
|---|---|---|
| 2,114,897 | Bird et al. | Apr. 19, 1938 |
| 2,609,193 | Foster | Sept. 2, 1952 |
| 2,622,700 | Geyer | Dec. 23, 1952 |
| 2,647,743 | Cook | Aug. 4, 1953 |